United States Patent
Begin et al.

(10) Patent No.: US 8,857,180 B2
(45) Date of Patent: *Oct. 14, 2014

(54) TURBOCHARGER BEARING ANTI-ROTATION PLATE

(75) Inventors: Louis P Begin, Rochester, MI (US); Brian J. Edwards, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/372,917

(22) Filed: Feb. 14, 2012

(65) Prior Publication Data

US 2013/0205775 A1   Aug. 15, 2013

(51) Int. Cl.
*F02B 33/44* (2006.01)
*F04B 17/00* (2006.01)
*F01P 1/06* (2006.01)

(52) U.S. Cl.
USPC ........ 60/605.3; 123/41.31; 417/407; 384/906

(58) Field of Classification Search
CPC ........ F02B 39/14; F02B 39/005; F02B 37/00; F01D 25/16; F01D 25/18; F01D 25/20; F01D 25/125; F01M 1/02; F01M 2011/021; F16C 35/067; F01P 3/20; F05B 2220/40; Y02T 10/144
USPC ............ 60/605.1, 605.3; 123/41.31; 417/407; 415/175, 229; 384/906
See application file for complete search history.

(56) References Cited

U.S. PATENT DOCUMENTS

| | | | | |
|---|---|---|---|---|
| 1,326,892 A | * | 12/1919 | Reynolds | 384/495 |
| 3,043,636 A | * | 7/1962 | MacInnes et al. | 384/287 |
| 3,808,661 A | * | 5/1974 | Carlsson | 384/439 |
| 3,969,804 A | * | 7/1976 | MacInnes et al. | 29/888.025 |
| 4,376,617 A | * | 3/1983 | Okano et al. | 417/407 |
| 4,704,075 A | * | 11/1987 | Johnston et al. | 417/407 |
| 5,007,746 A | * | 4/1991 | Matzelle et al. | 384/420 |
| 5,080,501 A | * | 1/1992 | Siebert et al. | 384/537 |
| 6,017,184 A | * | 1/2000 | Aguilar et al. | 415/112 |
| 6,394,660 B1 | * | 5/2002 | Butler et al. | 384/620 |
| 7,594,760 B2 | * | 9/2009 | Goss et al. | 384/517 |

(Continued)

FOREIGN PATENT DOCUMENTS

| | | | | |
|---|---|---|---|---|
| CN | 103180570 A | * | 6/2013 | F02B 39/00 |
| CN | 103244257 A | * | 8/2013 | F01D 25/16 |

(Continued)

*Primary Examiner* — Kenneth Bomberg
*Assistant Examiner* — Ngoc T Nguyen
(74) *Attorney, Agent, or Firm* — Quinn Law Group, PLLC

(57) ABSTRACT

A turbocharger for an internal combustion engine includes a bearing housing with a bearing bore and a semi-floating bearing disposed within the bore. The turbocharger also includes a shaft having a first end and a second end, wherein the shaft is supported by the bearing for rotation about an axis within the bore. The turbocharger also includes a turbine wheel fixed to the shaft proximate to the first end and configured to be rotated about the axis by post-combustion gasses emitted by the engine. Additionally, the turbocharger includes a compressor wheel fixed to the shaft proximate to the second end and configured to pressurize an airflow being received from the ambient for delivery to the engine. Furthermore, the turbocharger includes a plate secured within the bearing housing and configured to prevent rotation of the bearing about the axis. An internal combustion engine employing such a turbocharger is also disclosed.

14 Claims, 3 Drawing Sheets

(56) References Cited

U.S. PATENT DOCUMENTS

| | | | | |
|---|---|---|---|---|
| 7,753,591 | B2 * | 7/2010 | Petitjean et al. | 384/397 |
| 2011/0052429 | A1 * | 3/2011 | Marsal et al. | 417/407 |
| 2013/0255252 | A1 * | 10/2013 | Fonville et al. | 60/605.3 |

FOREIGN PATENT DOCUMENTS

| | | | | |
|---|---|---|---|---|
| DE | 102013202168 A1 * | 8/2013 | | F01D 25/16 |
| WO | WO2012058111 A2 * | 5/2012 | | F02B 39/00 |
| WO | WO2012064575 A2 * | 5/2012 | | F02B 39/00 |

* cited by examiner

TURBOCHARGER BEARING ANTI-ROTATION PLATE

TECHNICAL FIELD

The present disclosure relates to an anti-rotation plate for a turbocharger bearing.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical turbocharger employs a central shaft that transmits rotational motion between an exhaust-driven turbine wheel and an air compressor wheel. Such a shaft is generally supported by one or more bearings which are cooled and lubricated by engine oil and frequently receive additional cooling from specially formulated engine coolant.

SUMMARY

One embodiment of the disclosure is directed to a turbocharger for an internal combustion engine that includes a bearing housing with a bearing bore and a semi-floating bearing disposed within the bore. The turbocharger also includes a shaft having a first end and a second end, wherein the shaft is supported by the bearing for rotation about an axis within the bore. The turbocharger also includes a turbine wheel fixed to the shaft proximate to the first end and configured to be rotated about the axis by post-combustion gasses emitted by the engine. Additionally, the turbocharger includes a compressor wheel fixed to the shaft proximate to the second end and configured to pressurize an airflow being received from the ambient for delivery to the engine. Furthermore, the turbocharger includes a plate secured within the bearing housing and configured to prevent rotation of the bearing about the axis.

The bearing housing may include a feature and the plate may include a tab configured to engage the feature and thereby prevent the rotation of the plate about the axis.

The plate may define an inner opening configured to permit the shaft to pass therethrough. The inner opening may include a slot and the bearing may include a key configured to engage the slot and thereby prevent the rotation of the bearing about the axis.

The slot may include two slot portions positioned substantially 180 degrees apart. Additionally, the key may includes two segments positioned substantially 180 degrees apart such that each of the two segments is configured to engage one of the two slot portions.

Each of the two slot portions may include opposing faces that are configured parallel with respect to the axis. Also, each of the two segments may include opposing faces that are configured parallel with respect to the axis. When each of the two segments engages one of the two slot portions, at least one of the opposing faces of each segment may be configured to contact one of the opposing faces of the respective slot portion such that the contacting faces substantially coincide.

The turbocharger may also include a first clip. The first clip may facilitate retention of the bearing within the bore by limiting movement of the bearing along the axis. The first clip may additionally retain the plate in the bearing housing and maintain engagement between the slot and the key.

The turbocharger may additionally include a second clip. The second clip in conjunction with the first clip may retain the bearing within the bore.

Engine oil may be directed to lubricate the bearing and generate an oil film between the bearing and the shaft. Additionally, the bearing housing may include a drain volume for the engine oil, while the feature may be incorporated into the drain volume.

Another embodiment of the present disclosure is directed to an internal combustion engine having the turbocharger described above.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
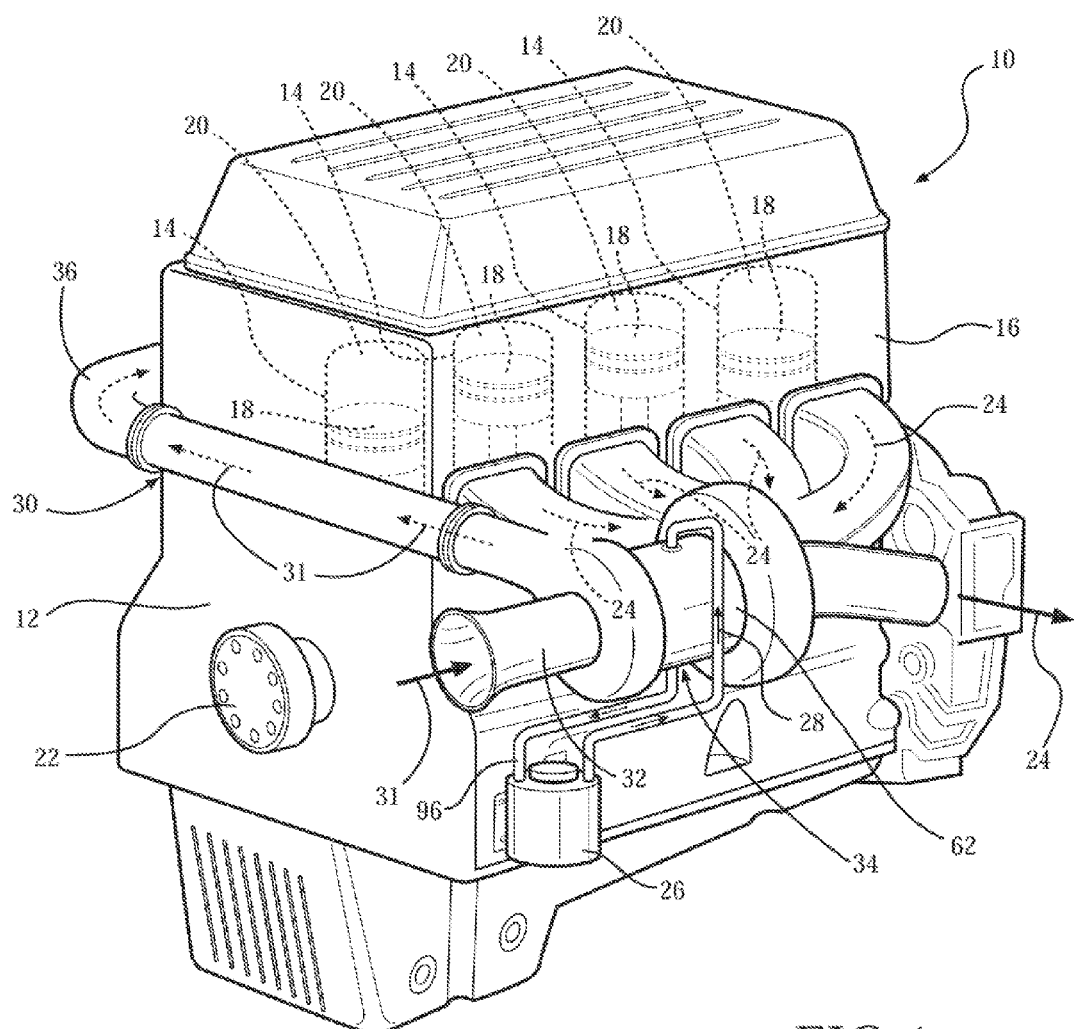
FIG. 1 is a schematic perspective view of an engine with a turbocharger according to the disclosure.

Referring to the drawings wherein like reference numbers correspond to like or similar components throughout the several figures, FIG. 1 illustrates an internal combustion engine 10. The engine 10 also includes a cylinder block 12 with a plurality of cylinders 14 arranged therein. As shown, the engine 10 also includes a cylinder head 16. Each cylinder 14 includes a piston 18 configured to reciprocate therein. Combustion chambers 20 are formed within the cylinders 14 between the bottom surface of the cylinder head 16 and the tops of the pistons 18. As known by those skilled in the art, combustion chambers 20 are configured to receive a fuel-air mixture for subsequent combustion therein.

The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 24 from the respective cylinder 14. The engine 10 also includes an oil pump 26. The oil pump 26 is configured to supply pressurized engine oil 28 to various bearings, such as that of the crankshaft 22. The oil pump 26 may be driven directly by the engine 10, or by an electric motor (not shown).

The engine 10 additionally includes an induction system 30 configured to channel airflow 31 from the ambient to the cylinders 14. The induction system 30 includes an intake air duct 32, a turbocharger 34, and an intake manifold 36. Although not shown, the induction system 30 may additionally include an air filter upstream of the turbocharger 34 for removing foreign particles and other airborne debris from the airflow 31. The intake air duct 32 is configured to channel the airflow 31 from the ambient to the turbocharger 34, while the turbocharger is configured to pressurize the received airflow, and discharge the pressurized airflow to the intake manifold 36. The intake manifold 36 in turn distributes the previously pressurized airflow 31 to the cylinders 14 for mixing with an appropriate amount of fuel and subsequent combustion of the resultant fuel-air mixture.

Figure 2:
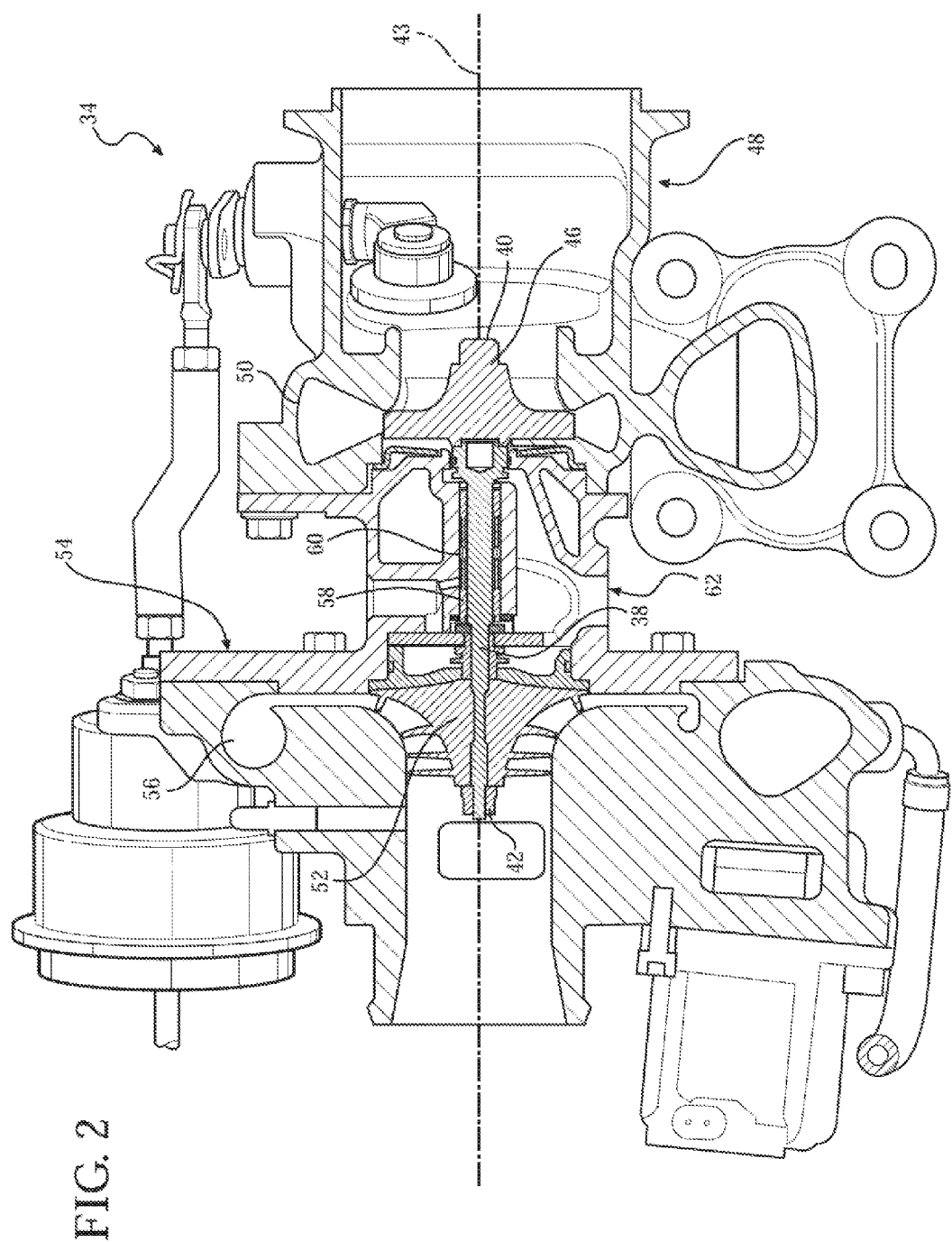
FIG. 2 is a schematic cross-sectional view of the turbocharger shown in FIG. 1, wherein the turbocharger includes a bearing housing.

As shown in FIG. 2, the turbocharger 34 includes a steel shaft 38 having a first end 40 and a second end 42. A turbine wheel 46 is mounted on the shaft 38 proximate to the first end 40 and configured to be rotated along with the shaft 38 about an axis 43 by post-combustion gasses 24 emitted from the cylinders 14. The turbine wheel 46 is disposed inside a turbine housing 48 that includes a volute or scroll 50. The scroll 50 receives the post-combustion exhaust gases 24 and directs the exhaust gases to the turbine wheel 46. The scroll 50 is configured to achieve specific performance characteristics, such as efficiency and response, of the turbocharger 34.

As further shown in FIG. 2, the turbocharger 34 also includes a compressor wheel 52 mounted on the shaft 38 proximate to the second end 42. The compressor wheel 52 is configured to pressurize the airflow 31 being received from the ambient for eventual delivery to the cylinders 14. The compressor wheel 52 is disposed inside a compressor cover 54 that includes a volute or scroll 56. The scroll 56 receives the airflow 31 and directs the airflow to the compressor wheel 52. The scroll 56 is configured to achieve specific performance characteristics, such as peak airflow and efficiency of the turbocharger 34. Accordingly, rotation is imparted to the shaft 38 by the post-combustion exhaust gases 24 energizing the turbine wheel 46, and is in turn communicated to the compressor wheel 52 owing to the compressor wheel being fixed on the shaft. As understood by those skilled in the art, the variable flow and force of the post-combustion exhaust gases 24 influences the amount of boost pressure that may be generated by the compressor wheel 52 throughout the operating range of the engine 10.

With continued reference to FIG. 2, the shaft 38 is supported for rotation about the axis 43 via a bearing 58. The bearing 58 is mounted in a bore 60 of a bearing housing 62 and is lubricated and cooled by the supply of pressurized engine oil 28 supplied via the pump 26. The bearing housing 62 may be cast from a robust material such as iron in order to provide dimensional stability to the bore 60 under elevated temperatures and loads during operation of the turbocharger 34. The bearing 58 is configured to control radial motion and vibrations of the shaft 38.

As shown, the bearing 58 is a semi-floating type of a journal bearing that is typically formed from a relatively soft metal, for example brass or bronze, such that the majority of wear from any contact between the shaft and the bearing would take place in the bearing. The semi-floating bearing 58 is generally restrained from shifting along the axis 43, but is provided with some freedom to shift radially within the bore 60, i.e., in a direction that is transverse to the axis 43. Such provision to shift radially, allows the bearing 58 to take up any radial displacement of the shaft 38, which may develop as a result of an imbalance in the shaft, turbine wheel 46, and/or the compressor wheel 52.

During operation of the turbocharger 34, the pressurized engine oil 28 from the pump 26 is delivered to the bearing housing 62 and directed to the bearing 58 to lubricate the bearing and generate a film of oil between the bearing's inner diameter and the shaft 38, and its outer diameter and the housing bore 60. Such an oil film serves to provide a hydrodynamic damping layer for supporting the rotating shaft 38 during operation of the turbocharger 34, thus reducing the likelihood of direct physical contact between the bearing 58 and the shaft 38, and the bearing 58 and the housing 62. In turn, such reduction of direct contact between the bearing 58, the shaft 38, and the housing 62 serves to extend useful life of the bearing, reduce frictional losses in the turbocharger 34, reduce noise, vibration, and harshness, and enhance response of the turbocharger during operation thereof.

Figure 3:
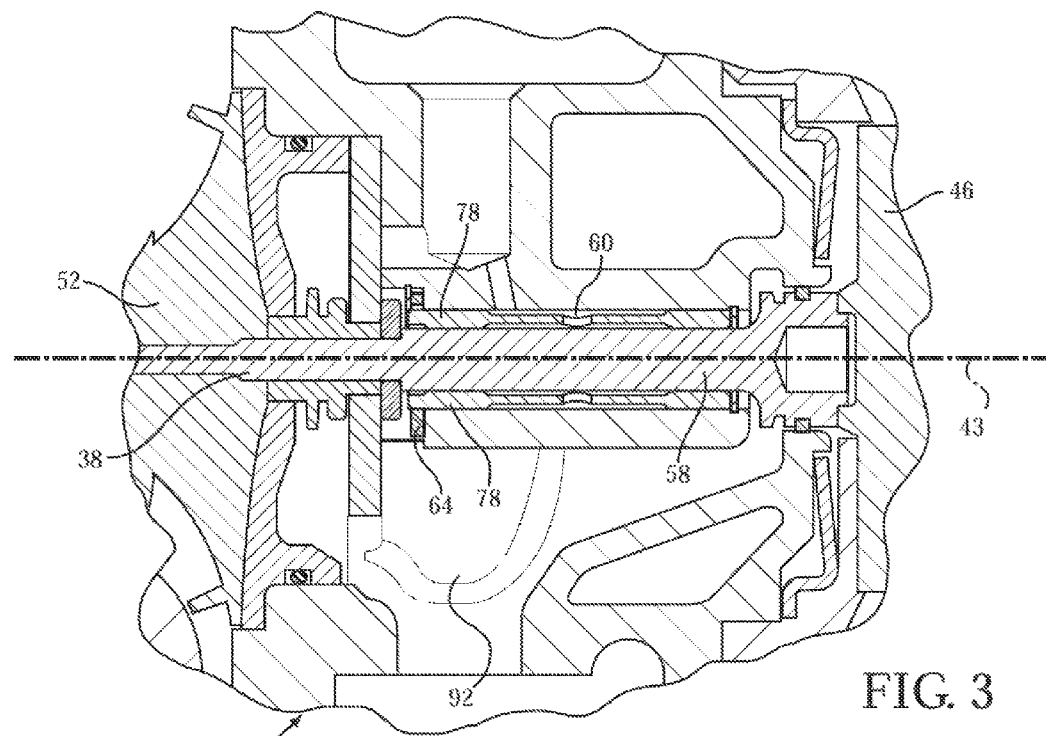
FIG. 3 is a schematic close-up cross-sectional view of the bearing housing shown in FIG. 2.
Figure 4:
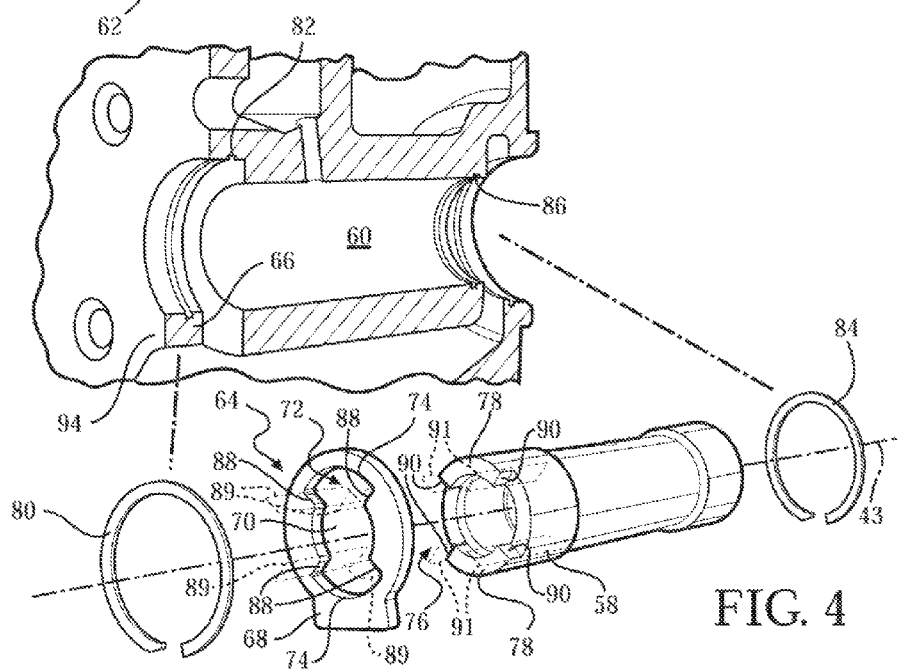
FIG. 4 is a schematic exploded perspective sectional view of the bearing housing shown in FIGS. 2 and 3, specifically showing details of a semi-floating bearing and a plate configured to prevent rotation of the bearing within the bearing housing.

As shown in FIG. 3, the turbocharger 34 also includes a plate 64 secured within the bearing housing 62 and configured to prevent rotation of the bearing 58 about the axis 43 along with the shaft 38. Severe sub-synchronous vibrations may occur if the bearing 58 is permitted to rotate within the housing bore 60. In order to prevent the above noted rotation of the bearing 58 about the axis 43, the bearing housing 62 includes a feature, which is shown in FIG. 4 as a channel 66, and the plate 64 includes a tab 68 configured to fit into and thereby engage the channel. The plate 64 defines an inner opening 70. The inner opening 70 is configured to permit the shaft 38 to pass therethrough, thus allowing the shaft to rotate within the bearing housing 62 without contacting the plate 64 and incurring additional frictional drag.

As shown in FIG. 4, the inner opening 70 of the plate 64 includes a slot 72 having two slot portions 74 positioned substantially 180 degrees apart. Furthermore, as also shown in FIG. 4, the bearing 58 includes a key 76 having two segments 78 positioned substantially 180 degrees apart. Accordingly, each of the two segments 78 is configured to engage one of the two slot portions 74 and thereby prevent rotation of the bearing 58 about the axis 43. The engagement between the segments 78 and the slot portions 74 includes a clearance at each segment and slot portion interface. The clearance between the segments 78 and the slot portions 74 is sufficient to provide freedom for the bearing 58 to shift radially within the bore 60 thus retaining the semi-floating nature of the bearing 58.

As additionally shown in FIG. 4, the turbocharger 34 also includes a first clip 80. The first clip 80 is configured to engage a channel 82 in the bearing housing 62, and once positioned in the channel 82 facilitates retention of the bearing 58 within the bore 60 by limiting movement of the bearing along the axis 43. The first clip 80 additionally retains the plate 64 in the bearing housing 62 and maintains engagement between the slot portions 74 of the slot 72 and the segments 78 of the key 76. The turbocharger 34 additionally includes a second clip 84. As shown in FIG. 4 the second clip 84 is configured to engage a channel 86 in the bearing housing 62. Once the second clip 84 is positioned in the channel 86, the first and second clips 80, 84 retain the bearing 58 within the bore 60.

Each of the slot portions 74 includes a pair of opposing faces 88. Each face 88 resides along a plane 89, such that the two planes 89 are parallel with respect to one another and also parallel with respect to the axis 43 when the plate 64 is mounted inside the bearing housing 62. Each of the segments 78 similarly includes a pair of opposing faces 90. Each face 90 resides along a plane 91, such that the two planes 91 are parallel with respect to one another and also parallel with respect to the axis 43 when the bearing 58 is mounted inside the bearing housing 62. When both the plate 64 and the bearing 58 are mounted inside the bearing housing 62, there is clearance between at least two of the adjacent faces 88 and 90. During operation of the turbocharger 34, when the turbocharger is developing boost or is spinning down from elevated speeds, at least one of the faces 88 contacts an adjacent face 90, such that the generated contact is substantially along the entire surface of the subject faces. In other words, when the adjacent faces 88 and 90 contact, the planes 89 and 91 of the contacting faces substantially coincide.

As a result of the contact between the adjacent faces 88 and 90, the reaction forces acting on each face are substantially perpendicular to the axis 43, and thus generate minimal thrust forces along the axis 43. Accordingly, such a contact between the adjacent faces 88 of the slot portions 74 and faces 90 of the segments 78 permits reduction in magnitude of forces applied by the bearing 58 axially against the clips 80 and 84. Furthermore, the reduction in magnitude of forces applied against the clips 80, 84 controls friction between the bearing 58 and the clips in order to maintain the above-described ability of the bearing to shift radially within the bore 60 that is critical to the semi-floating design.

The perpendicular nature of the contact between the adjacent faces 88 and 90 and the axis 43 also generate minimal radial forces. Bearing motion in the radial direction along the plane of contact between faces 88 and 90 merely has to overcome frictional forces at the contact. Bearing motion perpendicular to the planes 89 and 91 during contact between the faces 88 and 90 will cause the bearing to unload one contact and rotate about the other contact thereby minimizing the restriction to motion. Accordingly, the described contact between the adjacent faces 88 of the slot portions 74 and faces 90 of the segments 78 permits higher effectiveness of a resultant squeeze-film, i.e., compressed oil film, damper between the bearing 58 and the housing bore 60.

With resumed reference to FIG. 3, the bearing housing 62 includes a drain volume 92 for the engine oil that is supplied to the bearing housing from the pump 26. The drain volume 92 is an inner reservoir incorporated into the bearing housing 62, and may have an as-cast shape. As shown in the FIG. 4, the channel 66 may be incorporated into a wall 94 of the bearing housing 62 that leads into the drain volume 92. The channel 66 may be an as-cast feature of the bearing housing 62, or, for additional precision, may be machined into the wall 94. With resumed reference to FIG. 1, a discharge passage 96 removes oil from the bearing housing 62 following the lubrication of the bearing 58 and the oil's collection within the drain volume 92. As also shown in FIG. 1, the discharge passage 96 is in fluid communication with the pump 26 in order to return to the pump the oil from the drain volume 92.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A turbocharger for an internal combustion engine, the turbocharger comprising:
    a bearing housing having a bearing bore;
    a semi-floating bearing disposed within the bore;
    a shaft having a first end and a second end, the shaft being supported by the bearing for rotation about an axis within the bore;
    a turbine wheel fixed to the shaft proximate to the first end and configured to be rotated about the axis by post-combustion gasses emitted by the engine;
    a compressor wheel fixed to the shaft proximate to the second end and configured to pressurize an airflow being received from the ambient for delivery to the engine; and
    a plate secured within the bearing housing and configured to prevent rotation of the bearing about the axis;
    wherein:
        the bearing housing includes a feature and the plate includes a tab configured to engage the feature and thereby prevent the rotation of the plate about the axis;
        the plate defines an inner opening configured to permit the shaft to pass therethrough; and
        the inner opening includes a slot and the bearing includes a key configured to engage the slot and thereby prevent the rotation of the bearing about the axis.

2. The turbocharger of claim 1, wherein:
    engine oil is directed to lubricate the bearing and generate an oil film between the bearing and the shaft;
    the bearing housing includes a drain volume for the engine oil; and
    the feature is incorporated into the drain volume.

3. The turbocharger of claim 1, wherein the slot includes two slot portions positioned substantially 180 degrees apart and the key includes two segments positioned substantially 180 degrees apart such that each of the two segments is configured to engage one of the two slot portions.

4. The turbocharger of claim 3, wherein:
    each of the two slot portions includes opposing faces that are configured parallel with respect to the axis;
    each of the two segments includes opposing faces that are configured parallel with respect to the axis; and
    when each of the two segments engages one of the two slot portions, at least one of the opposing faces of each segment is configured to contact one of the opposing faces of the respective slot portion such that the contacting faces substantially coincide.

5. The turbocharger of claim 3, further comprising a first clip, wherein the first clip facilitates retention of the bearing within the bore by limiting movement of the bearing along the axis.

6. The turbocharger of claim 5, wherein the first clip additionally retains the plate in the bearing housing, and maintains engagement between the slot and the key.

7. The turbocharger of claim 5, further comprising a second clip, wherein the second clip in conjunction with the first clip retains the bearing within the bore.

8. An internal combustion engine comprising:
    a cylinder configured to receive an air-fuel mixture for combustion therein;
    a reciprocating piston disposed inside the cylinder and configured to exhaust post-combustion gasses from the cylinder; and
    a turbocharger including:
        a bearing housing having a bearing bore;
        a semi-floating bearing disposed within the bore;
        a shaft having a first end and a second end, the shaft being supported by the bearing for rotation about an axis within the bore;
        a turbine wheel fixed to the shaft proximate to the first end and configured to be rotated about the axis by the post-combustion gasses;
        a compressor wheel fixed to the shaft proximate to the second end and configured to pressurize an airflow being received from the ambient for delivery to the cylinder; and
        a plate secured within the bearing housing and configured to prevent rotation of the bearing about the axis;

wherein:

the bearing housing includes a feature and the plate includes a tab configured to engage the feature and thereby prevent the rotation of the plate about the axis;

the plate defines an inner opening configured to permit the shaft to pass therethrough; and the inner opening includes a slot and the bearing includes a key configured to engage the slot and thereby prevent the rotation of the bearing about the axis.

9. The engine of claim 8, further comprising an oil pump configured to pressurize engine oil, wherein:

the pressurized engine oil is directed to lubricate the bearing and generate an oil film between the bearing and the shaft;

the bearing housing includes a drain volume for the engine oil; and the feature is incorporated into the drain volume.

10. The engine of claim 8, wherein the slot includes two slot portions positioned substantially 180 degrees apart and the key includes two segments positioned substantially 180 degrees apart such that each of the two segments is configured to engage one of the two slot portions.

11. The engine of claim 10, wherein:

each of the two slot portions includes opposing faces that are configured parallel with respect to the axis;

each of the two segments includes opposing faces that are configured parallel with respect to the axis; and when each of the two segments engages one of the two slot portions, at least one of the opposing faces of each segment is configured to contact one of the opposing faces of the respective slot portion such that the contacting faces substantially coincide.

12. The engine of claim 8, further comprising a first clip, wherein the first clip facilitates retention of the bearing within the bore by limiting movement of the bearing along the axis.

13. The engine of claim 12, wherein the first clip additionally retains the plate in the bearing housing, and maintains engagement between the slot and the key.

14. The engine of claim 13, further comprising a second clip, wherein the second clip in conjunction with the first clip retains the bearing within the bore.

* * * * *